United States Patent [19]

Geibel et al.

[11] Patent Number: 4,814,224

[45] Date of Patent: Mar. 21, 1989

[54] POLY(ARYLENE SULFIDE KETONE) COMPOSITES

[75] Inventors: Jon F. Geibel, Bartlesville, Okla.; Roger G. Gaughan, Piscataway, N.J.; Michael D. Cliffton, Martineze, Ga.

[73] Assignee: Phillips Petroleum Company, Bartlesville, Okla.

[21] Appl. No.: 239

[22] Filed: Jan. 2, 1987

[51] Int. Cl.$^4$ .................... B32B 27/12; B32B 27/28; B32B 31/20

[52] U.S. Cl. .................... 428/252; 156/306.6; 156/309.6; 156/325; 428/285; 428/286; 428/288; 428/294; 428/408; 428/419; 428/689; 428/698; 428/902

[58] Field of Search .............. 156/306.6, 309.6, 325; 428/252, 285, 286, 288, 294, 419

[56] References Cited

U.S. PATENT DOCUMENTS

| | | | |
|---|---|---|---|
| 3,441,538 | 4/1969 | Marks | 260/49 |
| 3,785,916 | 1/1974 | Turton | 161/156 |
| 3,819,582 | 6/1974 | Feasey | 260/63 R |
| 4,361,693 | 11/1982 | Jansons | 528/86 |
| 4,389,453 | 6/1983 | Kitanaka-Deguchi | 428/240 |
| 4,504,551 | 3/1985 | Leland | 428/419 |
| 4,522,875 | 6/1985 | Still et al. | 428/419 |
| 4,590,104 | 5/1986 | Zeiner | 427/389.9 |

FOREIGN PATENT DOCUMENTS

| | | |
|---|---|---|
| 156131 | 10/1985 | European Pat. Off. . |
| 3405523 | 8/1985 | Fed. Rep. of Germany . |
| 3429670 | 2/1986 | Fed. Rep. of Germany . |

OTHER PUBLICATIONS

Mukherjee et al, "Preparation and Characterization of Poly(4,4'-benzophenone Sulphide)", Indian J. Chem. Sect. A, 21A(5)501-2 (1982).

*Primary Examiner*—James C. Cannon
*Attorney, Agent, or Firm*—Williams, Phillips & Umphlett

[57] ABSTRACT

A process to form a fiber-reinforced composite having a continuous thermoplastic matrix of poly(arylene sulfide ketone) resins is provided. The composite is useful to form shaped articles with high temperature resistance. The composite can be prepared by consolidating under heating a multi-layer stack of resin sheets and fiber reinforcement sheets. The poly(arylene sulfide ketone) resins can be melt-stabilized through treatment with a water-soluble salt of an alkaline earth metal. The composite has excellent thermal properties such as heat distortion temperature.

26 Claims, No Drawings

POLY(ARYLENE SULFIDE KETONE) COMPOSITES

BACKGROUND

This invention relates to fiber-reinforced thermoplastic composites. In another aspect it relates to a process for forming fiber-reinforced thermoplastic composites.

Processes are known in which fiber-reinforced composites are formed by compression of the fiber reinforcement between sheets of thermoplastic resin. Multilayer stacks of resin sheets and fiber reinforcement sheets allow the thickness of the composite to be varied. Suitable thermoplastic resins are exemplified by those such as polyolefins, polyesters, polyamides, polysulfones, poly(arylene sulfides), and polyacrylates.

The greatest usefulness of composites is in weight-sensitive high-performance applications subject to the limitation of the resin melting temperature. For example, maximum constant operating temperatures of available composites generally are in the range of from 265° to 300° F. Composites with higher use temperatures are desirable.

A poly(arylene sulfide ketone) resin with a melting point over 350° C. (622° F.) is mentioned in U.S. Pat. No. 3,819,582 as being moldable at 370° C. (698° F.) into a brittle film. Such brittle films cannot usually be melt processed further to form useful products. U.S. Pat. No. 4,590,104 discusses melt impregnation of fiber rovings with a low-molecular weight poly(arylene sulfide ketone) resin to form a fiber composite that exhibits after curing high toughness and good dimensional stability under heat and good solvent resistance. The curing is a requirement undesirable in the formation of composites since it adds time and therefore expense of making parts. In addition the increase in the glass transition temperature said to occur during curing indicates an alteration of the polymer.

OBJECTS OF THE INVENTION

One object of this invention is to provide a composite capable of high use temperatures. A further object of this invention is to provide a process for forming such a composite.

SUMMARY OF THE INVENTION

In accordance with one embodiment of the present invention, there is provided a fiber-reinforced poly(arylene sulfide ketone), (PASK). Where poly(phenylene sulfide ketone), (PPSK), is the selected PASK, use temperatures of the resultant composite may be in excess of 300° F.

In accordance with another embodiment of the present invention, there is provided a process for the preparation of a fiber-reinforced poly(arylene sulfide ketone) composite. The process comprises heating a multi-layer stack comprising at least one layer of poly(arylene sulfide ketone) resin and at least one layer of fiber reinforcement. During or after the heating step, the stack is compressed to form the composite. Where the PASK comprises a PPSK which has been melt-stabilized as hereinafter described, a rapid process for producing composites with good retention of resin properties is provided.

DETAILED DESCRIPTION OF THE INVENTION

In one embodiment of the invention there is utilized a poly(arylene sulfide ketone) resin of high-molecular weight, preferably a resin containing units of the structural formula:

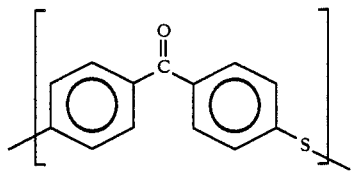

Even more preferred is a highly melt-stable resin which can be formed by treating the resin with an aqueous solution as hereinafter described.

High-molecular weight poly(arylene sulfide ketone)s generally require higher processing temperatures than the low-molecular weight resins. These higher temperatures can alter the resin and thereby hinder further processing. However, a melt-stabilized resin is capable of being processed in the melt without significant undesirable changes in properties. Melt stability, as used herein, is evaluated from the difference in melt flow rate for a resin sample preheated for two different periods of time before the flow rate measurement is made. The standard test conditions of ASTM D 1238 are modified by increasing the operating temperature to above the melting point of PASK resins. The test condition is 371° C./5 Kg and the melt flow rate is expressed as grams per 10 minutes, which is abbreviated 'g/10 min'. The two preheat periods of time are 5 and 15 minutes. The flow rate that is measured after each of the two periods is designated $FR_5$ and $FR_{15}$, respectively. When a resin is characterized as having a melt flow rate, the rate is that obtained by measurement with ASTM D 1238 as modified herein. A resin is characterized as melt stable, as used herein, when the flow rate ratio, $FR_{15}/FR_5$, is at least 0.25. A resin is characterized as highly melt stable when this ratio is at least 0.50.

The inventive resin that can be produced by the synthesis as described herein is characterized by having a melt flow rate in the range of about 40 to about 200 g/10 min. After melt processing such as extrusion to form pellets or sheets the inventive resin generally is characterized by having a melt flow rate in the range of about 20 to about 150 g/10 min., preferably in the range of about 35 to about 130 g/10 min. During further melt processing of pellets or sheets of the inventive resin such as injection molding the inventive resin in the form of the injection molded article is characterized further by having a melt flow rate in the range of about 5 to about 100 g/10 min., preferably in the range of about 10 to about 80 g/10 min. Resin that has been previously molded by injection can be processed even further in the melt to form resin sheets that are subsequently used in the inventive process. The continuous thermoplastic resin matrix of the composite can have a melt flow rate equivalent to the broad range of the injected molded article described herein with a preferred flow rate in the range of about 5 to about 50 g/10 min.

The preferred poly(phenylene sulfide ketone) resins are characterized as having a melting temperature, Tm, in the range of from 300° to 500° C., preferably from 310° to 425° C., most preferably from 320° to 380° C. and a glass transition temperature, Tg, in the range of from 110° to 240° C., preferably from 115° to 192° C., and most preferably from 120° to 160° C. The thermal transitions can be measured with a Perkin-Elmer DSC-2C Differential Scanning Calorimeter equipped with a computerized data system and a Perkin-Elmer TADS-1 plotter at sample heating rate of 20° C./minute. Another physical property of preferred neat resins after annealing at 240° C. for 4 hours is a heat deflection temperature in the range of from 330° to 400° F., preferably from 330° to 380° F. as measured by ASTM D 648. The heat deflection temperature of a 40 weight percent glass-filled inventive poly(phenylene sulfide ketone) resin composition is greater than 550° F., whereas for a 40 weight percent glass-filled polyphenylene sulfide resin the heat deflection temperature is about 500° F. This higher heat deflection temperature is a desirable property.

PASK resins can be prepared by reaction by a sulfur source with a halogenated diarylketone in a solvent. Sodium hydrosulfide, sodium sulfide or hydrogen sulfide are good sulfur sources, the most preferred being sodium hydrosulfide, NaHS. The preferred halogenated diarylketones are dihalobenzophenones, especially those with mono-halogen substitution on each of the aromatic rings, and even more preferred are compounds that are referred to as 4,4'-dihalobenzophenones, the most preferred being 4,4'-dichlorobenzophenone. Additional useful halogenated diarylketone compounds include 1,4-bis(4-chlorobenzoyl)benzene, 1,3-bis(4-chlorobenzoyl)benzene, 4,4'-bis(4-chlorobenzoyl)biphenyl, and 1,4-bis(4-fluorobenzoyl)benzene. The solvent serves as a reaction medium that at least partly dissolves the reactants and allows the reaction to proceed. The preferred solvent is an organic polar solvent such as an amide. The preferred amide comprises N-methyl-2-pyrrolidone.

The resin is recovered in fine particle form from the above reaction generally by filtration, and is preferably contacted with an aqueous solution containing from 1-10 weight percent of a source of an alkaline earth metal. Generally, the source is selected from among the group consisting of a water-soluble halide, nitrate, acetate and formate of an alkaline earth metal. The preferred source comprises calcium chloride or calcium acetate dissolved in water to give a concentration of from about 4 to about 6 weight percent of this compound. The resin treatment results in a preferred material that is characterized as a melt-stabilized or highly melt-stabilized poly(phenylene sulfide ketone) resin.

Preferred poly(arylene sulfide ketone) resins useful in the invention can further be characterized by a detectable calcium concentration. Generally the calcium concentration (expressed on an elemental calcium basis) is effective to melt stabilize the resin, such as in the range from about 50 to about 10,000 parts per million by weight, usually in the range of 100 to about 8,000 ppm, preferably in the range of about 200 to about 6,000 ppm. The calcium can be added to the resin such as by aqueous solution treatment as mentioned above.

The fiber reinforcement can be selected from a layer of loose fibers, randomly-oriented, or a layer of fibers in mat form, or a layer of resin-impregnated, optionally unidirectionally oriented, fibers. The layer of a fibrous reinforcing material is preferably provided in the form of woven fiber mat, chopped fiber mat, continuous strand mat or non-woven fiber mat, the most preferred being chopped fiber mat or continuous strand mat. The mats are composed of fibers of glass, carbon, aramid (aromatic polyamide), or metal or mixtures thereof. Also used are mats composed of fibers from fiber-forming inorganic materials such as beryllia, magnesia, alumina, silica, zirconia, thoria, boron nitride, boron carbide, silicon carbide and alumino-silicate and mixtures thereof. The preferred fiber mats comprise fibers of glass, carbon, aramid or mixtures thereof. In a further preferred embodiment the fibers are glass or carbon. In one embodiment the carbon fibers are in the form of a chopped fiber mat having a weight of from one to about 5 ounces per square yard and in a second embodiment the glass fibers are in the form of a continuous strand mat.

In the practice of the present invention the preferably melt-stabilized poly(arylene sulfide ketone) resin is provided in sheet form. Sheet preparation methods that use softened or melted resin such as compression molding, extrusion, and blow molding or methods such that use a solution of the resin in a volatile solvent are known. The sheet-forming method is selected to match the overall process of this invention when run in different modes such as continuous or batch thereby providing an efficient, lowest cost process. In the batch mode single sheets of the resin can be used in the multi-layer stack. These single sheets can be provided by compression molding. In a continuous process to form the multi-layer stack a continuous supply of the resin sheet is provided from a roll or by extrusion prior to or during operation of the stacking process.

Compression molding of poly(arylene sulfide ketone) resins of the present invention produces sheets that are rough, contiguous and creasable.

The thickness of the resin sheet is selected to provide sufficient resin to wet-out the fiber reinforcement, to yield a continuous resin matrix, and to make a composite of the desired dimensions. The resin sheets range from a thickness of less than one mil to about 125 mils. The resin sheet preferably is from about 1 to about 20 mils thick.

The multi-layer stack can be formed by hand-lay up of at least one sheet of resin and at least one layer of fiber reinforcement. The multi-layer stack can be formed of alternating layers of sheets of resin and layers of fiber reinforcement. Layer arrangements other than alternating in the multi-layer stack can also be used. In an alternate mode the multi-layer stack can be formed continuously from supplies of resin sheet and fiber reinforcement. By passing the stack through a heated continuous-belt compaction device such as is known in the art desirable composites can be continuously formed. Further consolidation of the resin and fiber reinforcement by a compression means can be provided if desired.

The multi-layer stack is heated by a means effective to soften the PASK resin, usually to melt it within a period of time of less than 10 minutes, preferably less than 5 minutes, and most preferably less than 2 minutes. Without limiting the heating means to a specific method or apparatus, the use of a heated platen is mentioned as being effective for batch mode preparation of the composites. The temperature of the platens can be adjusted to melt the resin sheets within the preferred time.

The heated multi-layer stack is compressed by a means effective to cause the softened resin to flow into and around the fiber reinforcement, usually to impregnate and wet-out the fiber reinforcement within a period of time less than 10 minutes, preferably less than 5 minutes, and most preferably about 2 minutes, to form a continuous resin matrix. Without limiting the compression means to a specific method or apparatus, a heated-platen press is mentioned as an effective means for batch preparation of the composites.

The rate of cooling of the consolidated multi-layer stack having a PASK resin as the continuous matrix influences the properties of the matrix and consequently, can change the properties of the composite. Rapid cooling, often referred to as quenching, can yield a resin matrix that is amorphorus or with only a small amount of crystallinity as determined by thermal and x-ray analyses. Quenching can be practiced by immersing the consolidated multi-layer stack in ice water.

One means to cool the composite is to transfer a heated assemblage of cover plates, release cloth, and the consolidated multi-layer stack to a water-cooled platen press so that the assemblage can be quickly cooled under pressure. Alternately, the heated platen press that contains the consolidated multi-layer stack is allowed to cool slowly by reducing the applied heat to a temperature at which the continuous resin matrix is solid. If desired, the composite can be annealed by maintaining the composite at an temperature above the glass transition temperature, $T_g$, but at least 90° F. (50° C.) less than the melting temperature, $T_m$, for a period of time of a few hours.

EXAMPLE 1

POLYMER PREPARATION

Polymerizations were performed in two gallon, fast-stirring stainless steel autoclaves manufactured by Autoclave Engineers, Inc. equipped with electric heating mantles. The autoclave was equipped with thermostatically-controlled cooling coils, a safety pressure rupture disk, manually-controlled pressure release ports, isolatable distillation condenser, and isolatable monomer charging cylinder. The autoclave and charging cylinder both had pressure gauges and nitrogen inlet valves. The temperature of the reaction mixture was recorded by a J-type thermocouple in a well in the autoclave.

A typical nominal 2-mole scale polymerization was performed according to the following procedure: The autoclave was charged with 2.0 moles sodium hydrosulfide (190.12 grams NaSH solution of 58.97 wt. % purity), 2.015 moles sodium hydroxide (80.6 grams), 2.015 moles 4,4'-dichlorobenzophenone (506.99 grams), 6.0 moles deionized water (108 ml), and 24.84 moles N-methyl-2-pyrrolidone (NMP), (2400 ml). The autoclave was sealed and degassed via pressure-release cycles with nitrogen. The agitator was run at 250 rpm. The temperature of the reaction mixture was raised to 250° C. and held there for three hours. The agitator speed was then increased to 500 rpm and the temperature of the reaction mixture was raised to 300° C. Upon reaching 300° C., heating was terminated and 475 ml deionized water were slowly pressured into the autoclave. The autoclave was then cooled at about 1° C./minute by blowing air through the cooling coils. The next morning the polymer was removed from the autoclave. The product was granular in form and was washed with hot (80° C.) city water on a 100 mesh screen to remove NMP, NaCl, and extremely fine particles of polymer. The granular product was washed exhaustively on the screen until the wash water was clear. The wet polymer was then charged to a 2 gallon autoclave along with three liters deionized water and 30 g. sodium hydroxide. The reaction mixture was purged with nitrogen while stirring and heated to 125° C. Upon reaching 125° C., the reaction mixture was cooled. The product was filtered and rinsed with deionized water. A dried portion of the polymer had a melt flow rate, $FR_5$, of 127 g/10 min. and an inherent viscosity of 0.59 dl/g. The remaining wet polymer was then charged to a 2 gallon autoclave with three liters deionized water and 150 grams calcium acetate. The reaction mixture was degassed with nitrogen and heated to 185° C. and held for thirty minutes. The mixture was cooled. The product was collected by filtration, and rinsed with cool deionized water. The product was dried to a constant weight in an air-circulating oven at ~100° C. The resulting polymer was an off-white, free-flowing, granular material. Typical analysis on the resins gives: carbon-72.9 wt.%; hydrogen-3.57 wt.%; oxygen-7.97 wt.%; sulfur-14.41 wt.%; chlorine-0.53 wt.%; ash-0.3 wt.% and calcium-642 ppm. The inherent viscosity (ASTM D2857) in concentrated sulfuric acid at 30° C. of the reactor product from the first step is greater than 0.5 dl/g, and generally is in the range from 0.51 to about 2 dl/g.

Pelletization was performed according to the following procedure: The granular melt-stabilized poly(phenylene sulfide ketone) reactor product was dried at 110° C. in a vacuum oven overnight. A one-inch bench scale extruder (Model 50, NRM Corporation, Tallmadge, OH 44278) was equipped with a vibra-feeder and dry nitrogen purge to blanket the feed zone and feed hopper. The extruder was heated (Zone 1, 360° C.; Zone 2, 360° C.; Die, 354.4° C.) and the screw was run at 120 rpm. The reactor product was fed to the extruder at a rate such that the extruder was "starve fed". The polymer was quenched in a water bath. The strand of polymer was chopped. Pelletization throughput was approximately three kilograms per hour.

EXAMPLE 2

POLYMER MELT STABILITY DEMONSTRATED

The data that are presented in Table I illustrate the melt stable behaviour of three resins in granular form that were prepared by the procedure in Example 1, except that the resin identified as Run 1 was evaluated before melt-stability treatment with aqueous calcium solution.

TABLE 1

| | MELT FLOW RATE, g/10 min[a] | | | | |
|---|---|---|---|---|---|
| | 5 min[b] | 10 min[b] | 15 min[b] | $FR_{15}/FR_5$ | COMMENT |
| Run 1 | 127 | 60 | — | — | Before Ca treatment |
| Run 2 | 95 | 75 | 40 | 0.42 | After Ca treatment |
| Run 3 | 82 | 46 | 31 | 0.38 | After Ca treatment |

[a]Measured according to ASTM D1238 (Modified), Condition 371° C./5 kg
[b]Time of preheat with temperature set at 371° C.

When the melt-stabilized resin of Run 3 was pelletized as described in Example 1, the melt flow rate of the pellets was 64 grams/10 minutes. This provides a further indication that the resin is melt-stabilized.

EXAMPLE 3

POLYMER SHEETS FORMED

Sheets were prepared from melt-stable poly(phenylene sulfide ketone) (PPSK) resins that were synthesized as described in Example 1. The powdered resins were heated at 110° C. in a vacuum oven overnight. A one-inch bench scale extruder at 360° C. die temperature was used to pelletize the resin particles. The pellets were heated at 200° C. for one hour in a forced-draft oven before being used to form sheet in a PHI Press (Pasadena Hydraulics Inc., El Monte, CA) at 360° C. platen temperature. 9.6 g PPSK pellets were placed in the cavity of a 6×6 inch picture frame mold. The mold was closed by an aluminum cover on the bottom and top. The frame and aluminum covers were coated with Frekote 33 Release Interface (Frekote Inc., Boca Raton, FL). The platens were closed to touch the covered mold and after 1.5 minutes at zero applied pressure, the pressure was increased slowly to 20,000 psi and held at pressure for 1.0 minute. The assemblage of the frame, cover sheets and polymeric sheet was removed from the press and immersed in ice water. The quenched PPSK sheets were recovered for use.

The sheets prepared by this procedure were 16 mil thick and contained no more than one bubble per sheet.

EXAMPLE 4

COMPOSITES FORMED

The conditions necessary to wet-out fiber reinforcement with a poly(phenylene sulfide ketone) resin were established by varying the temperature of impregnation, the pressure of compression and the sheet size as described below.

Six by six inch sheets of poly(phenylene sulfide ketone) resin, 5 mils thick were prepared in a picture frame mold by compression at 651 psi and a temperature of 690° F. (366° C.). Whole sheets or portions thereof were used to prepare multi-layered stacks to yield about a 40 weight percent random-oriented continuous strand glass fiber mat, type M 8610 (Owens-Corning Fiberglass Corporation, Toledo, Ohio), reinforced composite or about a 20 weight percent random-oriented chopped carbon fiber mat, 2 ounces per square yard (International Paper Corporation, Formed Fabrics Division, Tuxedo Park, NY) reinforced composite. The heating temperature and compressing pressure were varied and the composites evaluated visually. The runs are summarized in Table II.

TABLE II

| Run | Sheet Size, in. | Mat | Temperature | Ram Pressure | Comments |
|---|---|---|---|---|---|
| 4 | 3 × 3 | Glass | 690° F. | 2½ Ton | Brittle, no impregnation |
| 5 | 3 × 3 | Glass | 725° F. | 2½ Ton | Overflow, excess pressure |
| 6 | 6 × 6 | Glass | 725° F. | 2½ Ton | No penetration |
| 7 | 6 × 6 | Glass | 725° F. | 5 Ton | Flexible, wet out |
| 8 | 6 × 6 | Carbon | 725° F. | 5 Ton | Wet out, looked good |

Run 4 indicates that either the temperature or pressure or both were insufficient to impregnated the fiber reinforcement. In Run 5 excessive pressure was exerted on the smaller sheet. With the larger sheet Run 6 indicates the pressur of Run 5 was insufficient. In Runs 7 and 8 the conditions produced a satisfactory composite.

EXAMPLE 5

The following example illustrates the process to form composites. A 6×6 inch sheet of poly(phenylene sulfide ketone) was heated at 320° F. (160° C.) for four hours. Multi-layer stacks were prepared from combinations of 2- and 3-ounce per square yard random-oriented, chopped carbon fiber mat (International Paper Corporation, Formed Fabrics Division, Tuxedo Park, N.Y.) and the PPSK sheets 5 to 16 mil thick. The stacks were placed on a non-porous release cloth Rel-ease No. 234 TFNP (Air Tech International Inc., Carson, CA) between two smooth metal cover plates and placed without a mold in a Carver platen press at 725° F. (385° C.) for one and one-half minutes at contact pressure. The pressure was increased to 150 psi and held there for two minutes. The stacked assemblage was transferred from the heated press to a tap water-cooled press and maintained at 150 psi. After cooling to room temperature the composite was recovered. Composites containing 17 and 21 weight percent carbon fiber were 120 and 90 mils thick, respectively. Each composite was visually free of air voids. The physical properties of each composite are given in Table III.

TABLE III

| Composite Thickness, Mils | 90 | 120 |
|---|---|---|
| Tensile Modulus[1], MSI | 1.95 | — |
| Tensile Strength[1], KSI | 21.40 | — |
| Tensile Elongation[1], % | 1.11 | — |
| Flexural Modulus[2], MSI | 1.69 | — |
| Flexural Strength[2], KSI | 30.43 | — |
| Maximum Deflection[2], inch | 0.66 | — |
| Fiber Strain[2], % | 0.022 | — |
| Izod Impact[3], Notched, ft-lb/in | 1.00 | 0.97 |
| Izod Impact[3], Unnotched, ft-lb/in | 4.79 | 5.87 |

[1]ASTM D-638
[2]ASTM D-790
[3]ASTM D-256

That which is claimed is:
1. A process comprising:
   a. forming a stack having a multiplicity of layers, at least one layer comprising a fiber reinforcement, and at least one layer comprising a high molecular weight poly(arylene sulfide ketone) resin having a calcium content in the range from about 50 to about 10,000 parts per million by weight and characterized by an inherent viscosity of greater than 0.5 dl/g, and a melting temperature in the range of from 300° to 500° C., said resin further having a melt stability such that the melt flow rate ratio, $FR_{15}/FR_5$, is at least 0.25, where $FR_{15}$ and $FR_5$ are the flow rates of the resin as measured by ASTM D 1283 after said resin is held at melt temperature for 15 and 5 minutes, respectively;
   b. heating the stack to a temperature to cause the at least one resin layer to become flowable, and to form a heated stack;
   c. compressing the heated stack sufficiently to form a consolidated stack characterized by a continuous thermoplastic resin matrix containing fiber reinforcement; and
   d. cooling the consolidated stack.
2. A process of claim 1 wherein the high molecular weight poly(arylene sulfide ketone) resin comprises a resin containing units of the structural formula:

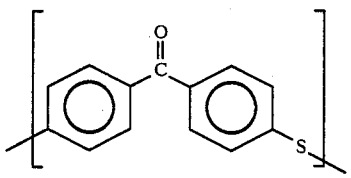

3. A process of claim 2 wherein the poly(arylene sulfide ketone) resin is characterized by a calcium content in the range of about 200 to about 6,000 parts per million and an inherent viscosity in the range from 0.51 to about 2 dl/g.

4. A process of claim 1 wherein the fiber reinforcement is selected from the group consisting of woven fiber mat, chopped fiber mat, continuous strand mat and non-woven fiber mat and wherein the amount of said fiber reinforcement is about 30 to about 80 weight percent, based on the total weight of the consolidated stack.

5. A process of claim 4 wherein the stack comprises a plurality iof layers of a fiber reinforcement selected from the group consisting of glass fiber, carbon fiber, aromatic polyamide fiber, elemental metal fiber, elemental metal alloy fiber, beryllia fiber, magnesia fiber, alumina fiber, silica fiber, zirconia fiber, thoria fiber, boron nitride fiber, boron carbide fiber, silicon carbide fiber and aluminosilicate fiber.

6. A process of claim 2 wherein the fiber reinforcement is selected from the group consisting of woven fiber mat, chopped fiber mat, continuous strand mat and non-woven fiber mat and wherein the amount of said fiber reinforcement is about 30 to about 80 weight percent, based on the total weight of the consolidated stack.

7. A process of claim 6 wherein the stack comprises a plurality of layers of a fiber reinforcement selected from the group consisting of glass fiber, carbon fiber, aromatic polyamide fiber, elemental metal fiber, elemental metal alloy fiber, beryllia fiber, magnesia fiber, alumina fiber, silica fiber, zirconia fiber, thoria fiber, boron nitride fiber, boron carbide fiber, silicon carbide fiber and aluminosilicate fiber.

8. A composition comprising a fabric of fibrous reinforcing material embedded in a continuous matrix of thermoplastic resin, wherein said resin comprises a high molecular weight poly(arylene sulfide ketone) resin having a calcium content in the range from about 50 to about 10,000 parts per million by weight, an inherent viscosity of greater than 0.5 dl/g, a melting temperature in the range of from 300° to 500° C., and a melt stability such that the melt flow rate ratio, $FR_{15}/FR_5$, is at least 0.25 where $FR_{15}$ and $FR_5$ are the flow rates of the resin as measured by ASTM D 1238 after said resin is held at melt temperature for 15 and 5 minutes, respectively.

9. A composition as in claim 8 wherein the poly(arylene sulfide ketone) resin comprises a poly(phenylene sulfide ketone) resin having an inherent viscosity of greater than 0.5 dl/g, a melting temperature in the range of from 300° to 500° C., and a melt stability such that the melt flow rate ratio, $FR_{15}/FR_5$, is at least 0.25 where $FR_{15}$ and $FR_5$ are the flow rates of the resin as measured by ASTM D 1238 after said resin is held at 371° C. for 15 and 5 minutes, respectively.

10. A composition as in claim 9 wherein the poly(phenylene sulfide ketone) resin contains a calcium content in the range of about 200 to about 6,000 parts per million by weight.

11. A composition as in claim 8 wherein the fibrous reinforcing material comprises a mat selected from the group consisting of woven fiber mat, chopped fiber mat, continuous strand mat and non-woven fiber mat and said fibrous reinforcing material is present in the range of about 30 to about 80 by weight percent, based on the total weight of the composition.

12. A composition as in claim 11 wherein the mat is made from a fiber selected from the group consisting of glass fiber, carbon fiber, aromatic polyamide fiber, metal fiber, beryllia fiber, magnesia fiber, alumina fiber, silica fiber, zirconia fiber, thoria fiber, boron nitride fiber, boron carbide fiber, silicon carbide fiber and aluminosilicate fiber.

13. A composition of claim 9 wherein the fibrous reinforcing material comprises a mat selected from the group consisting of woven fiber mat, chopped fiber mat, continuous strand mat and non-woven fiber mat and said fibrous reinforcing material is present in the range of about 30 to about 80 weight percent, based on the total weight of the composition.

14. A composition of claim 13 wherein the mat is made from a fiber selected from the group consisting of glass fiber, carbon fiber, aromatic polyamide fiber, metal fiber, beryllia fiber, magnesia fiber, alumina fiber, silica fiber, zirconia fiber, thoria fiber, boron nitride fiber, boron carbide fiber, silicon carbide fiber and aluminosilicate fiber.

15. A composition as in claim 9 wherein the poly(phenylene sulfide ketone) resin has a melt flow rate ratio, $FR_{15}/FR_5$, greater than 0.50.

16. A composition as in claim 14 wherein the poly(phenylene sulfide ketone) resin has a melt flow rate ratio, $FR_{15}/FR_5$, greater than 0.50.

17. A composition as in claim 8 wherein the high molecular weight poly(arylene sulfide ketone) resin contains a calcium content in the range of about 200 to about 6,000 parts per million by weight.

18. A composition of claim 17 wherein the high molecular weight poly(arylene sulfide ketone) resin is characterized as forming when subjected to compression molding a creaseable sheet of resin having a thickness of about 1 to about 20 mils.

19. A composition of claim 18 wherein the high molecular weight poly(arylene sulfide ketone) comprises a high molecular weight poly(phenylene sulfide ketone) resin.

20. A composition of claim 8 wherein the high molecular weight poly(arylene sulfide ketone) resin having a calcium content and a melt stability comprises a high molecular weight poly(arylene sulfide ketone) resin that has been contacted with an aqueous solution containing from about 1 to about 10 weight percent of a source of an alkaline earth metal, based on weight of the solution.

21. A composition of claim 10 wherein the poly(phenylene sulfide ketone) resin containing calcium comprises poly(phenylene sulfide ketone) resin that has been contacted with an aqueous solution containing from about 1 to about 10 weight percent of a source of an alkaline earth metal, based on weight of the solution.

22. A composition of claim 21 wherein the source of the alkaline earth metal contains calcium as calcium chloride or calcium acetate or mixtures thereof.

23. A composition of claim 10 wherein the high molecular weight poly(phenylene sulfide ketone) resin is further characterized as forming when subjected to compression molding a creasable sheet of resin having a thickness of about 1 to about 20 mils.

24. A fiber-reinforced thermoplastic composite made by the process of claim 1.

25. A fiber-reinforced thermoplastic composite made by the process of claim 2.

26. A fiber-reinforced thermoplastic composite made by the process of claim 3.

* * * * *